(12) United States Patent
Riley et al.

(10) Patent No.: US 9,116,945 B1
(45) Date of Patent: Aug. 25, 2015

(54) PREDICTION OF HUMAN RATINGS OR RANKINGS OF INFORMATION RETRIEVAL QUALITY

(75) Inventors: Michael Dennis Riley, New York, NY (US); Corinna Cortes, New York, NY (US)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/488,148

(22) Filed: Jun. 4, 2012

Related U.S. Application Data

(63) Continuation of application No. 11/160,872, filed on Jul. 13, 2005, now Pat. No. 8,195,654.

(51) Int. Cl.
*G06F 17/30* (2006.01)

(52) U.S. Cl.
CPC ...... *G06F 17/30386* (2013.01); *G06F 17/3053* (2013.01)

(58) Field of Classification Search
CPC .............. G06F 17/30386; G06F 17/3053
USPC ......... 707/707, 723, 726–728, 736–758, 944; 706/12
See application file for complete search history.

(56) References Cited

U.S. PATENT DOCUMENTS

| | | | |
|---|---|---|---|
| 5,787,424 A | 7/1998 | Hill et al. | |
| 6,012,053 A | 1/2000 | Pant et al. | |
| 6,546,388 B1 | 4/2003 | Edlund et al. | |
| 7,346,839 B2 | 3/2008 | Acharya et al. | |
| 7,716,225 B1 | 5/2010 | Dean et al. | |
| 8,001,118 B2 | 8/2011 | Dean et al. | |
| 8,195,654 B1 * | 6/2012 | Riley et al. ................... | 707/726 |
| 2001/0011270 A1 | 8/2001 | Himmelstein et al. | |
| 2002/0143630 A1 | 10/2002 | Steinman et al. | |
| 2003/0153299 A1 | 8/2003 | Perfit et al. | |
| 2004/0215606 A1 | 10/2004 | Cossock | |
| 2005/0120006 A1 | 6/2005 | Nye | |
| 2005/0125382 A1 * | 6/2005 | Karnawat et al. .................. | 707/3 |
| 2005/0125390 A1 | 6/2005 | Hurst-Hiller et al. | |
| 2005/0154686 A1 | 7/2005 | Corston et al. | |
| 2005/0210024 A1 * | 9/2005 | Hurst-Hiller et al. ............. | 707/5 |
| 2006/0004891 A1 | 1/2006 | Hurst-Hiller et al. | |
| 2006/0259861 A1 * | 11/2006 | Watson ........................ | 715/705 |
| 2007/0005568 A1 | 1/2007 | Angelo et al. | |

OTHER PUBLICATIONS

Toms et al., "Augmenting and Limiting Search Queries", Eleventh Text Retrieval Conference (TREC 2002), Nov. 19-22, 2002, 10 pages.
Jung et al., "SERF: Integrating Human Recommendations with Search", Oregon State University, 2004, pp. 571-580.
Freund et al., "An Efficient Boosting Algorithm for Combining Preferences", Journal of Machine Learning Research, No. 4, 2003, p. 933-969.

(Continued)

*Primary Examiner* — Miranda Huang
(74) *Attorney, Agent, or Firm* — Harrity & Harrity, LLP

(57) ABSTRACT

A statistical model may be created that relates human ratings of documents to objective signals generated from the documents, search queries, and/or other information (e.g., query logs). The model can then be used to predict human ratings/rankings for new documents/search query pairs. These predicted ratings can be used to, for example, refine rankings from a search engine or assist in evaluating or monitoring the efficacy of a search engine system.

20 Claims, 8 Drawing Sheets

(56) References Cited

OTHER PUBLICATIONS

Thorsten Joachims, "Evaluating Retrieval Performance using Clickthrough Data", SIGIR workshop on Mathematical/Formal Methods in Information Retrieval, Tampere, Finland, Aug. 2002, 18 pages.

Iyer et al., "Boosting for Document Routing", In Proceedings of the Ninth International Conference on Information and Knowledge Management, McLean, VA, USA, Nov. 6-11, 2000, pp. 70-77.

* cited by examiner

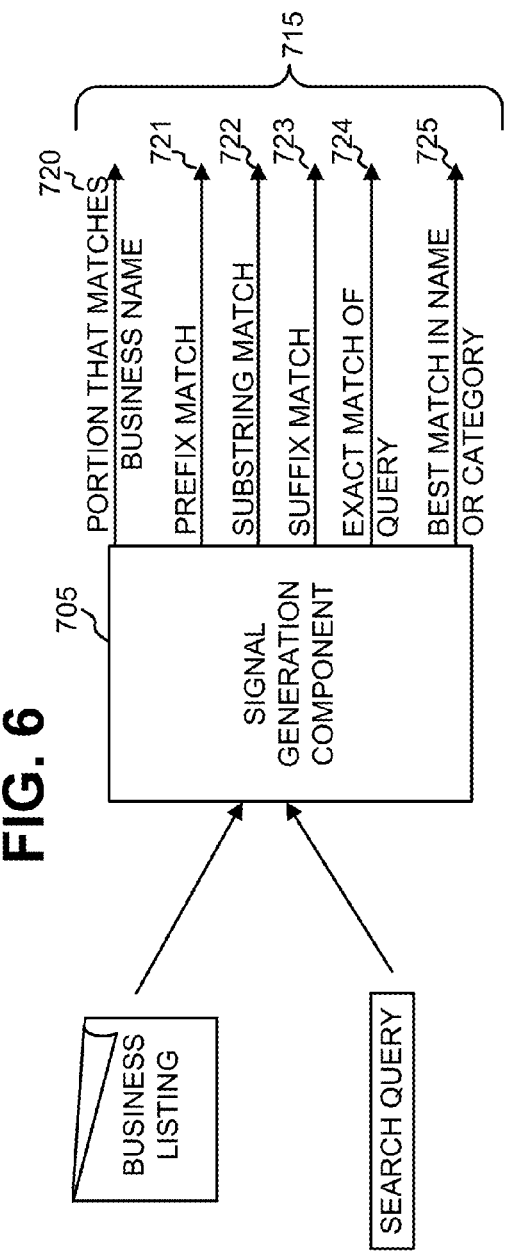

PREDICTION OF HUMAN RATINGS OR RANKINGS OF INFORMATION RETRIEVAL QUALITY

RELATED APPLICATION

This application is a continuation of co-pending U.S. patent application Ser. No. 11/160,872, filed on Jul. 13, 2005, the disclosure of which is hereby incorporated by reference herein.

BACKGROUND

A. Field of the Invention

Implementations consistent with the principles of the invention relate generally to information retrieval and, more particularly, to improving results of search engines.

B. Description of Related Art

Search engines assist users in locating desired portions of information from a document corpus. A general web search engine, for instance, catalogs web pages and, in response to a user's request, returns the answer directly or to a set of references to documents relevant to the request. A search engine may also be a more specialized search engine, such as a local search engine, which, given a search request and a geographic location, returns results, such as business listings, that are relevant to the search request and that are located near the geographic location.

Search engines may base their determination of relevance on search terms (called a search query) entered by the user. The goal of the search engine is to identify high quality relevant results based on the search query. Typically, the search engine accomplishes this by matching the terms in the search query to a corpus of pre-stored documents. Documents that contain the user's search terms are considered "hits" and are returned to the user. The set of hits is typically very large and needs to be prioritized or ranked before being returned to the user.

The hits returned by the search engine are typically sorted based on relevance to the user's search terms. Determining the correct relevance, or importance, of a document to a user, however, can be a difficult task. For one thing, the relevance of a document to the user is inherently subjective and depends on the user's interests, knowledge, and attitudes. There is, however, much that can be determined objectively about the relative importance or quality of a document. One existing technique of determining relevance is based on matching a user's search terms to terms indexed from the documents. Other existing techniques attempt to objectively measure the quality of a document based on more than the content of the web page. For example, in the context of a linked set of documents, one prior technique for measuring quality assigns a degree of importance to a document based on the link structure of the set of documents.

The quality of a search engine may be assessed by humans rating the relevance of the top documents returned by the search engine in response to a query. For a search engine, returning the most relevant documents to the user is of paramount importance. Thus, any improvement to the ability of a search engine to return relevant results is desirable.

SUMMARY

One aspect is directed to a method that includes receiving a group of search query/search result pairings and generating, for each of the pairings, a set of objective signals derived from the pairings. The method further includes obtaining a relevance evaluation for each of the pairings from a human evaluator, where the relevance evaluations measure a relevance of the search query to the corresponding search result of the pairing. Still further, the method includes training a statistical model, based on the obtained relevance evaluations and the set of objective signals, to predict a relevance evaluation for another search query/search result pairing.

Another aspect is directed to a computer-implemented method for performing a search. The method includes receiving a search query, identifying documents relevant to the search query, and obtaining signals based on the search query and the identified documents. The method further includes obtaining predicted relevance evaluations for the documents based on the signals, where the predicted relevance evaluations are obtained from a statistical model trained on the signals and on human generated relevance evaluations. Additionally, the method includes ranking the documents based on the predicted relevance ratings.

Yet another aspect is directed to a method of assessing an effectiveness of a search engine. The method includes submitting search queries to the search engine; identifying documents relevant to the search query from the search engine; obtaining signals based on the search query and the identified documents; and obtaining predicted relevance evaluations for the identified documents based on the signals, where the predicted relevance evaluations are obtained from a statistical model trained on the signals and on human generated ratings. The method further includes assessing the effectiveness of the search engine based on the predicted relevance evaluations.

Yet another aspect is directed to a search engine comprising a processor and a memory including processing instructions for execution by the processor. The instructions include instructions to calculate a group of signals based on input document/search query pairs; instructions to obtain relevance ratings for the document/search query pairs, the relevance ratings predicting a level of relevance that a human user would assign the document/search query pairs; and instructions for using the relevance ratings to refine a ranking of the input documents of the input documents/search query pairs.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a diagram of a table illustrating an exemplary corpus of search query/search result pairs and their human assigned relevance ratings;

FIG. 7 is a diagram illustrating generation of an exemplary set of signals for input to the human ratings model;

DETAILED DESCRIPTION

The following detailed description of the invention refers to the accompanying drawings. The detailed description does not limit the invention.

Overview

Techniques are described herein in which human estimated or predicted evaluations are used to directly rank or assist in ranking search engine results. The predicted human ratings may also be used to indirectly improve search engine results by assisting in the evaluation of the results of the search engines.

Figures 1A, 1B:
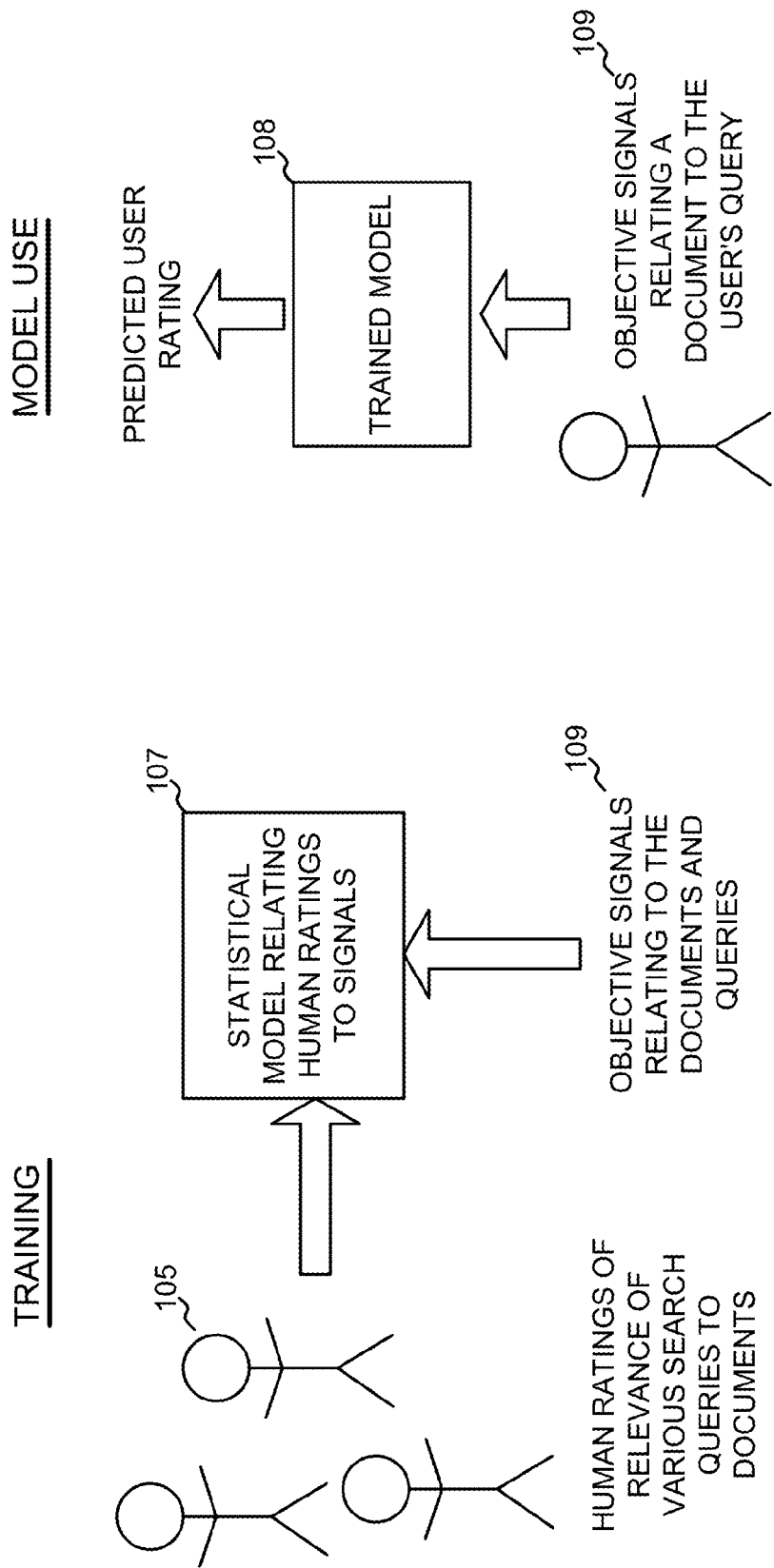
FIGS. 1A and 1B are diagrams conceptually illustrating an exemplary implementation of the techniques described herein.

FIGS. 1A and 1B are diagrams conceptually illustrating an exemplary implementation of the techniques described herein. In general, human ratings relating to document/search query pairings may be used to train a statistical model (FIG. 1A). Once trained, the model may be used to automatically generate predicted user ratings of new documents/search query pairings (FIG. 1B).

As illustrated in FIG. 1A, a number of human evaluators 105 may provide ratings of various documents to search queries. For example, a human evaluator may be shown a web page that corresponds to the home page of the store "Home Depot" and asked to rate how relevant this web page is to the search query "home improvement store." The human evaluator may provide their rating as, for example, a number within a range (e.g., 1-5). A number of such ratings, possibly collected from numerous human evaluators shown numerous search query/document pairings, may be collected.

For each of the search query/document pairings, one or more "signals" 109 may be automatically generated based on the particular search query/document pairing. The signals can include, for example, an indication of the portion of the search query that matches a link to the document or whether the search query matches a business name or category associated with the document. These two signals are exemplary. Additional signals, some of which are described in more detail below, can be used. A statistical model 107 may be generated relating the human ratings to the signals.

FIG. 1B generally illustrates operation of the trained version of statistical model 107, shown as trained model 108. Trained model 108, given signals 109 for a particular document and search query, generates predicted ratings. Ideally, the predicted ratings will match the evaluator ratings that a human would typically assign to the document/search query pairing. The predicted ratings could be used in a number of applications, such as to rank documents that are to be returned from a search engine or to evaluate the results of search engines.

Exemplary System Overview

Figure 2:
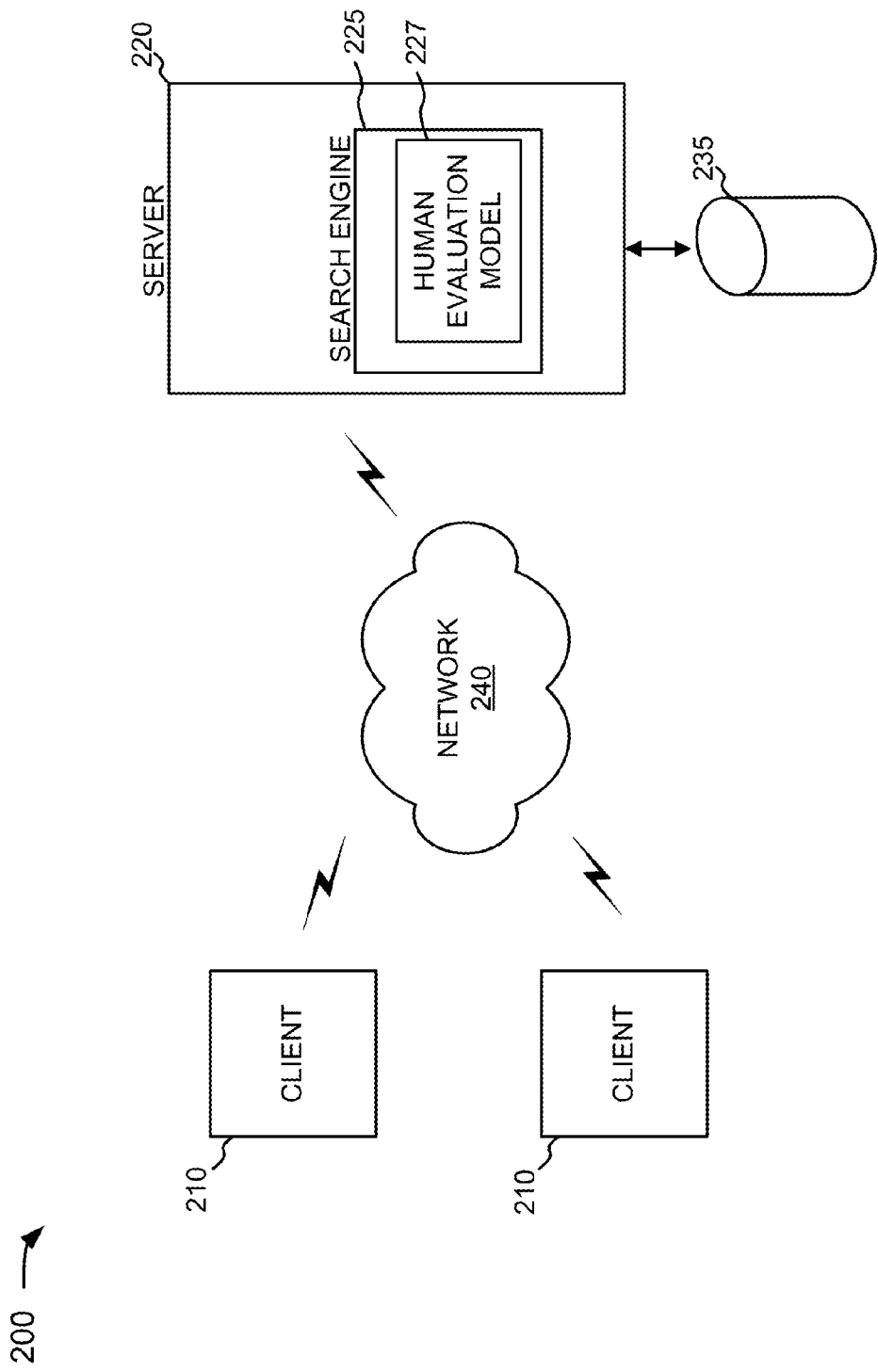
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Clients 210 and server 220 may connect to network 240 via wired, wireless, or optical connections.

A client 210 may include a device, such as a personal computer, a wireless telephone, a personal digital assistant (PDA), a lap top, or another type of computation or communication device, a thread or process running on one of these devices, and/or an object executable by one of these devices. Server 220 may include a server device that processes, searches, and/or maintains documents. The documents may be maintained in database 235.

Server 220 may include a search engine 225 usable by clients 210. In one implementation, search engine 225 may be a local search engine designed to return documents having local relevance to the users. In other implementations, search engine 225 may be a general web search engine. Search engine 225 may include or be associated with a human evaluation model 227, which may generally be used to assist search engine 225 in returning relevant documents to clients 210. The operation of human evaluation model 227 in the context search engine 225 will be described in more detail below.

The documents processed by search engine 225 may be indexed and stored in a data structure, such as database 235. When search engine 225 operates as a local search engine, the documents in database 235 may be local documents in the sense that they are associated with a particular geographic area—though not necessarily the same geographic area. A document that relates to a business listing, for example, can be considered a local document because it is associated with the particular address of the business.

A document, as the term is used herein, is to be broadly interpreted to include any machine-readable and machine-storable work product. A document may be an e-mail, a business listing, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Figure 3:
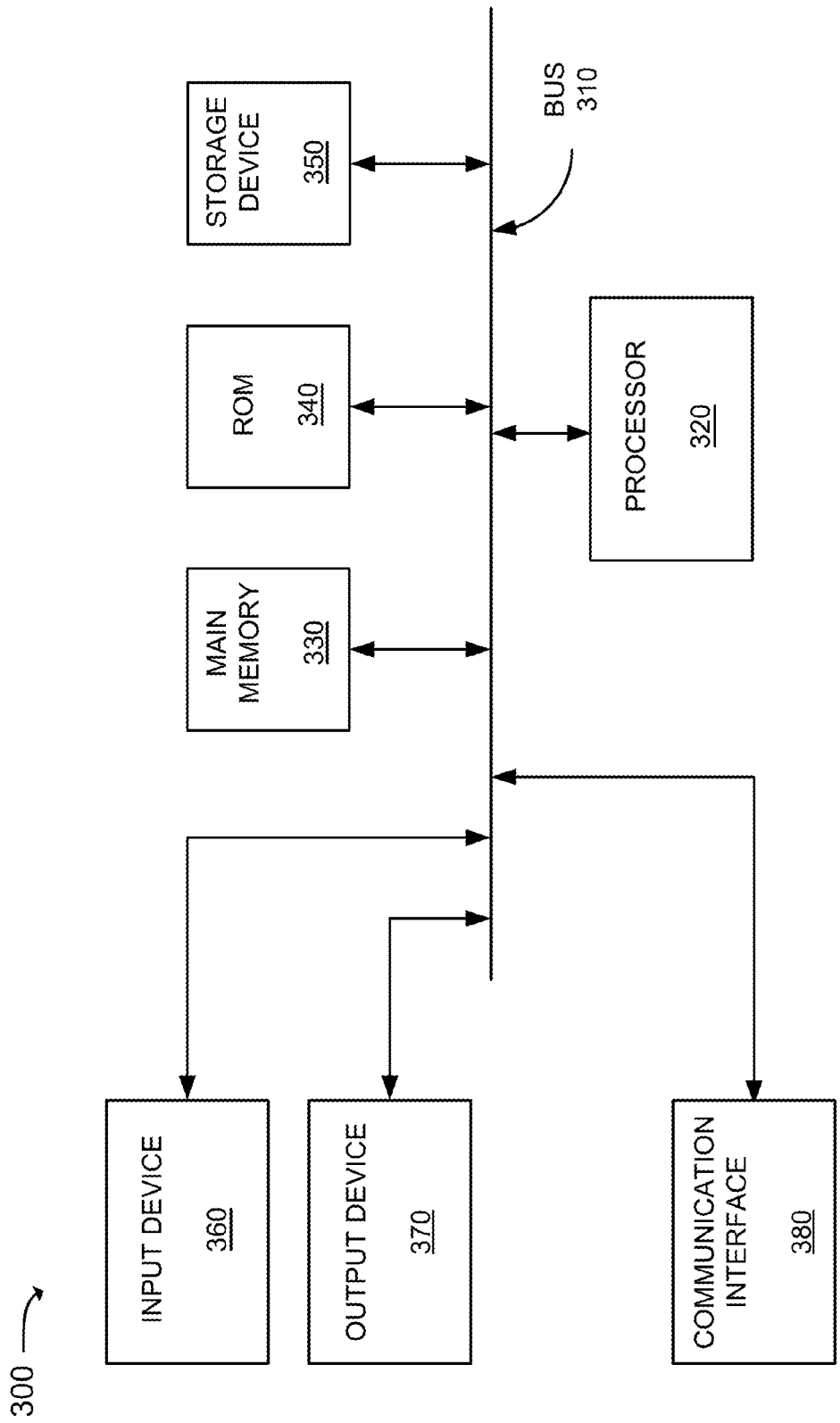
FIG. 3 is an exemplary diagram of a computing device shown in FIG. 2.

FIG. 3 is an exemplary diagram of a client 210 or server 220, referred to as device 300, according to an implementation consistent with the principles of the invention. Device 300 may include a bus 310, a processor 320, a main memory 330, a read only memory (ROM) 340, a storage device 350, an input device 360, an output device 370, and a communication interface 380. Bus 310 may include a path that permits communication among the components of device 300.

Processor 320 may include any type of conventional processor, microprocessor, or processing logic that may interpret and execute instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include a mechanism that permits a user to input information to device 300, such as a keyboard, a mouse, a pen, voice recognition and/or biometric mechanisms, etc. Output device 370 may include a mechanism that outputs information to the user, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 240.

Server 220, consistent with the principles of the invention, performs certain searching or document retrieval related operations through search engine 225 and/or human evaluation model 227. Search engine 225 and/or human evaluation model 227 may be stored in a computer-readable medium, such as memory 330. A computer-readable medium may be defined as one or more physical or logical memory devices and/or carrier waves.

The software instructions defining search engine 225 and/or human evaluation model 227 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Operation of Human Evaluation Model in the Context of Local Search

Search engine 225, when operating as a local search engine, may return documents, such as business listings, that are relevant to a search query and to a specific geographic area. For example, if a user enters the search query "pizza" and the zip code 10012 (New York city), search engine 225 may return a list of pizza restaurants in or near this zip code. When returning the results to the user, search engine 225 may sort the results based on relevance of the listing to the search query and also based on a geographic location of the business to the user. Ideally, the most relevant business listings that are close to the user should be returned first or higher in the search results.

Human evaluation model 227 may assist search engine 225 in determining the relevance of a document (i.e., a business listing) to the user search query. Before being used in a "live" search engine, human evaluation model 227 is first trained.

Figure 4:
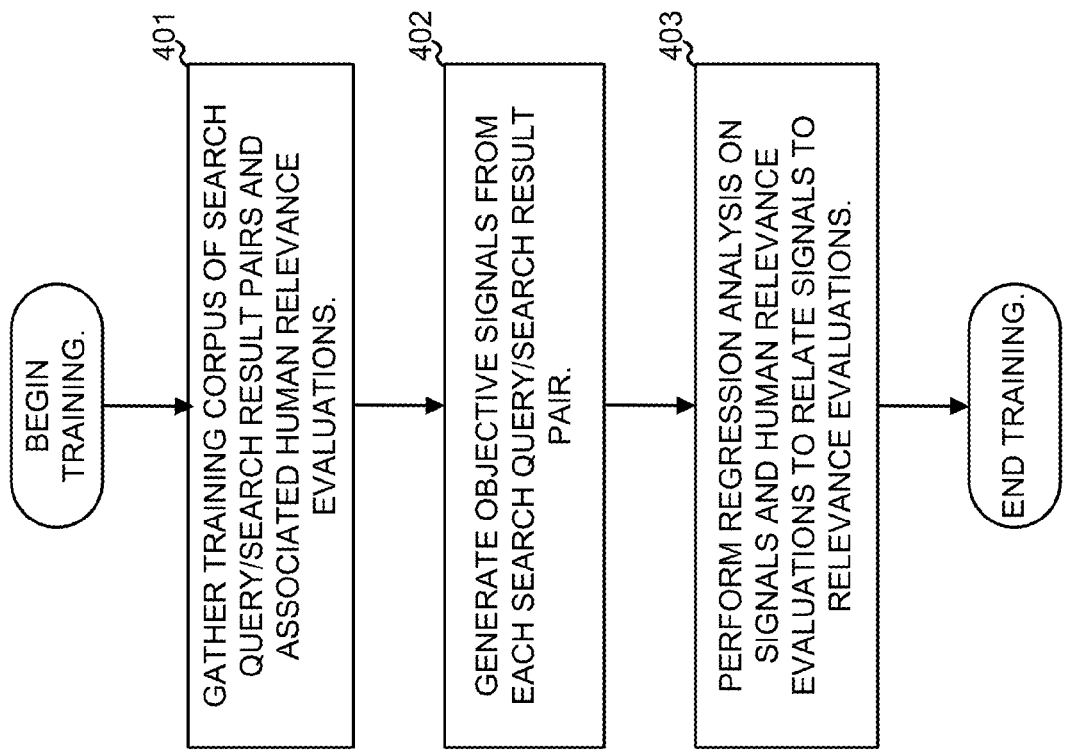
FIG. 4 is a diagram illustrating exemplary operations for training the human ratings model shown in FIG. 2.

FIG. 4 is a diagram illustrating exemplary operations for training human evaluation model 227. A training corpus of search query and local search result pairs may be generated (act 401). Each pair in the corpus may be manually rated by a human (act 401).

Figure 5:
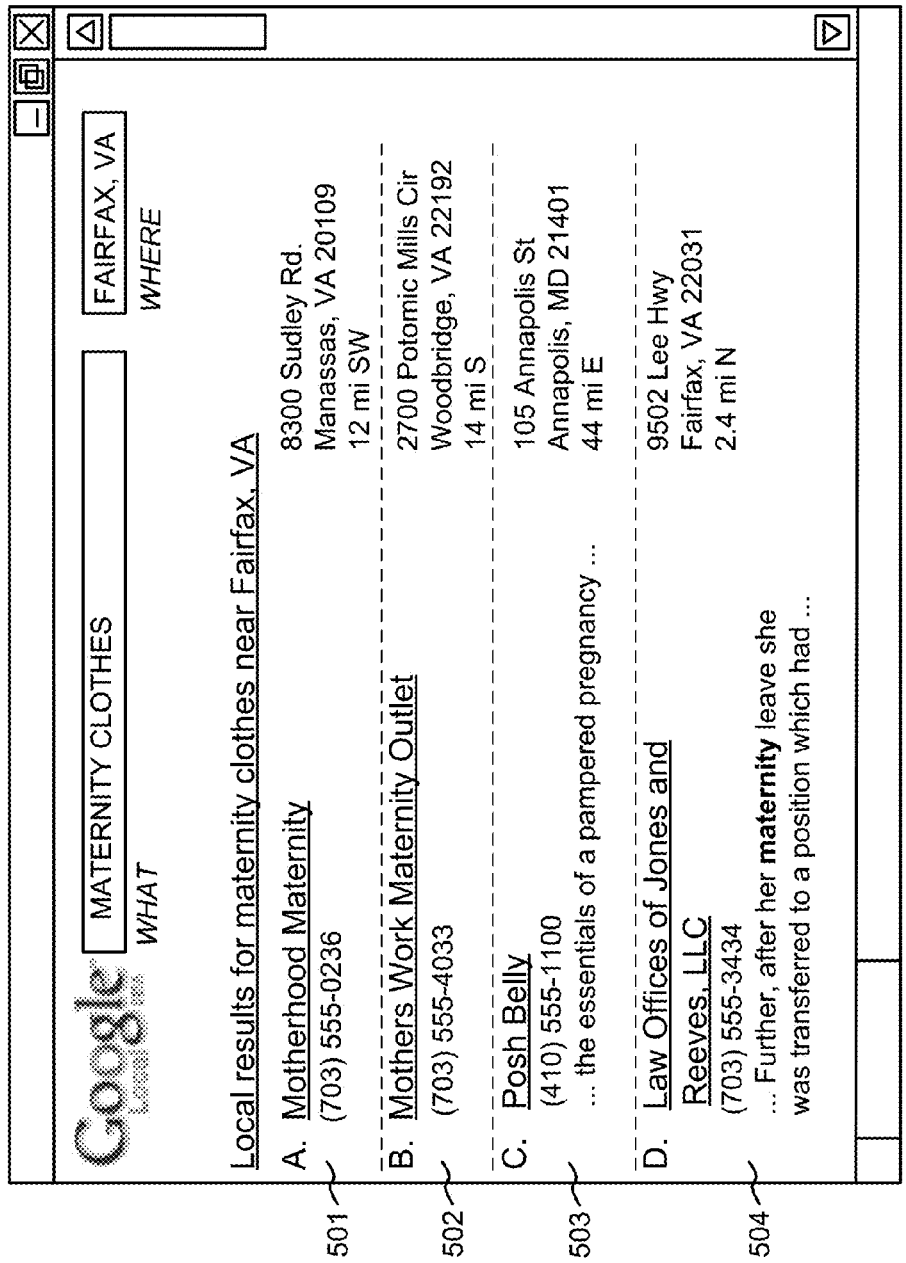
FIG. 5 is a diagram illustrating exemplary local search results for an exemplary search query.

FIG. 5 is a diagram illustrating exemplary local search results 501-504 for a search query "maternity clothes." As shown, for this search query and the geographic limitation of "Fairfax, Va.," each result 501-504 is a business listing of a business that the search engine determined to be relevant to the user search query.

Each resultant directory listing 501-504, when coupled with the search query, may define a search query/search result pair. Accordingly, four different search result pairs can be created from the documents shown in FIG. 5: search result 501 and the search query "maternity clothes;" search result 502 and the search query "maternity clothes;" search result 503 and the search query "maternity clothes;" and search result 504 and the search query "maternity clothes." In some implementations, the geographic limitation field may be assumed to be a part of the search query.

As mentioned, the search query/search result pairs may be evaluations by a human evaluator for their relevance to one another. The human evaluator may evaluate the search query/search result pairs by rating the pairs on any convenient scale, such as by rating each pair on a scale from zero to three, where three is defined as the most relevant and zero is defined as the least relevant. In the example shown in FIG. 5, for instance, when rating the results, a typical human evaluator may give directory listings 501 and 502 a relevancy score of three, as these two listings are for stores that specialize in selling maternity clothes, which are likely to be highly relevant to someone entering the search query "maternity clothes." A human evaluator is likely to give directory listing 503 a relevancy score less than three, such as a score of one, as this listing is for a business that caters to pregnant women, but does not specialize in selling maternity clothes. Listing 504 is likely to receive a relevance rating of zero from the human evaluator, as a law office is not likely to be relevant to a person searching for maternity clothes.

In other implementations, the human evaluator, instead of subjectively rating the search query/search result pairs via a rating value, may subjectively evaluate the search query/search result pairs using other techniques, such as by ranking a number of search results for relevance to a search query. Instead of rating listings 501-504 on a scale of zero to three, the human evaluator may rank listings 501-504 by ordering the listings in an order that the human evaluator believes goes from most relevant to least relevant to the search query.

FIG. 6 is a diagram of a table 600 illustrating an exemplary corpus of search query/search result pairs and their human assigned relevance ratings. Each row of table 600 associates a search query 605 with a search result 610 and the relevance rating (or, in alternate implementations, a relevance ranking) 615 that was assigned by a human. Search results 610 may be stored in table 600 as any convenient document identifier, such as a document Uniform Resource Locator (URL), a hash value that identifies the document, or as the full version of the document. Relevance ratings 615 may each define, for example, a single rating polled from a single human evaluator or an average of multiple ratings polled from multiple evaluators. In practice, the training corpus may be relatively large, and table 600 may include entries for hundreds or thousands (or more) of search query/search result pairs and their human assigned relevance ratings. In one implementation, the training corpus may be generated by randomly picking a certain number of queries (e.g., 5000) and asking human evaluators to evaluate the top ten results returned by search engine 225 (using any conventional search query to document content matching techniques) for each of the queries.

Referring back to FIG. 4, signals may be determined for each of the search query/search result pairs (i.e., each of the rows in table 600) in the training corpus (act 402). The signals may generally be based on the search query and its associated search result document.

FIG. 7 is a diagram illustrating generation of an exemplary set of signals. A set of signals 715 is generated by a signal generation component 705 based on a particular input document (i.e., business listing) and search query. Signal generation component 705 may generate a similar set of signals 715 for each search query/search result pair in the training corpus. Signals 715 are chosen for particular relevance to a local search engine and, as shown, include individual signals 720-725.

Signal 720 may be represented as a value that defines the number of words in the search query that match the business name associated with the search result document. In one implementation, this signal may have a value ranging from zero to one, in which one indicates that all the words in the search query match the business name and zero indicates none of the words in the search query match the business name. In FIG. 5, for example, one word from the two words in the search query "Maternity Clothes" match the business name "Motherhood Maternity," giving signal 720 for this pairing a value of 0.5.

One of ordinary skill in the art will recognize that numerous techniques, in addition to the example given above, could be used to generate a value that generally measures a portion of the terms in a search query that match a business name. Also, in addition to or instead of matching the search query terms to the business name, the search query terms could be matched to the name of a category associated with the search query. Categories are commonly associated with business listings returned in local search results. A pizza restaurant may, for example, be listed in the category "restaurants" and the sub-category "Italian restaurants."

Signals 721-723 may indicate whether the search query matches a prefix portion of the business name, is a substring of the business name, or matches a suffix portion of the business name, respectively. As a specific exemplary example of implementations of signals 721-723, signals 721-723 may be assigned a value of one for a match and a value of zero if there is no match. For example, if the search query is "Lowe's" or "Lowe" and a business name is stored as "Lowe's Home Improvement," the search query matches the prefix portion of the business name and is a substring of the business name. Accordingly, signals 721 and 722 may be assigned the value of one and signal 723 assigned the value of zero. On the other hand, if the search query is "home improvement" and the business name is stored as "Lowe's Home Improvement," the search query matches the suffix portion of the business name and is a substring of the business name. Accordingly, signals 722 and 723 may be assigned the value of one and signal 721 assigned the value of zero.

Signal 724 may indicate whether the search query exactly matches the business name. For example, a search query for "Home Depot" exactly matches the business name "Home Depot," and accordingly, in this situation, signal 724 may be given the value one. If, however, the search query was "Home Depot garden" and the business name is "Home Depot," the signal may be given the value zero.

Signal 725 may indicate whether the best match of the search query to the business listing is to the business name or to the category name in which the business is listed. Signal 725 may, for example, be given a value of one when the best match is to the business name and a value of zero when the best match is to the category name.

One of ordinary skill in the art will recognize that signals 721-725 in signal set 715 are exemplary. Other signals based on the search query, the result document, and possibly other information, could be generated and included in signal set 715. In particular, one class of signals that could additionally be included in signal set 715 are signals that will be referred to herein as dynamic signals. The dynamic signals may be signals derived from prior local search sessions that are observed by search engine 225. For example, certain user clicking actions in response to a set of search results may indicate that a resultant business listing is a "good" business listing for the corresponding search query. Quickly clicking on a business listing or clicking on a phone number link, directions link, or other link associated with the business listing may indicate that the business listing is "good." Dynamic signals may be derived by identifying "good clicks" and, for example, then using the frequencies relating to clicks associated with queries, business categories, and their co-occurrences as signals in the signal set. Dynamic signals are also described in more detail below with reference to FIG. 9.

In general, when deciding which signals to include in signal set 715, it is better to error on the side of over-including many signals rather than under-including signals, as signals that are statistically not relevant to the human relevance ratings/rankings tend to be recognized by the model and deemphasized.

A regression (or ranking) analysis may next be performed on the generated signals and the corresponding human relevance ratings/rankings (act 403). In one implementation, linear regression using the least squares method of measuring error may be used in which the signals in signal set 715 are the independent (X) variables and the human relevance ratings are the dependent (Y) variable. Other regression analysis techniques could also be used, such as, without limitation, logistic regression, Poisson regression, or other supervised learning techniques. The result of the regression analysis may be a number of weights that define how future values of a signal set 715 are to be combined to generate a predicted relevance rating for the signal set. These weights thus define the trained human evaluation model 227.

Figure 8:
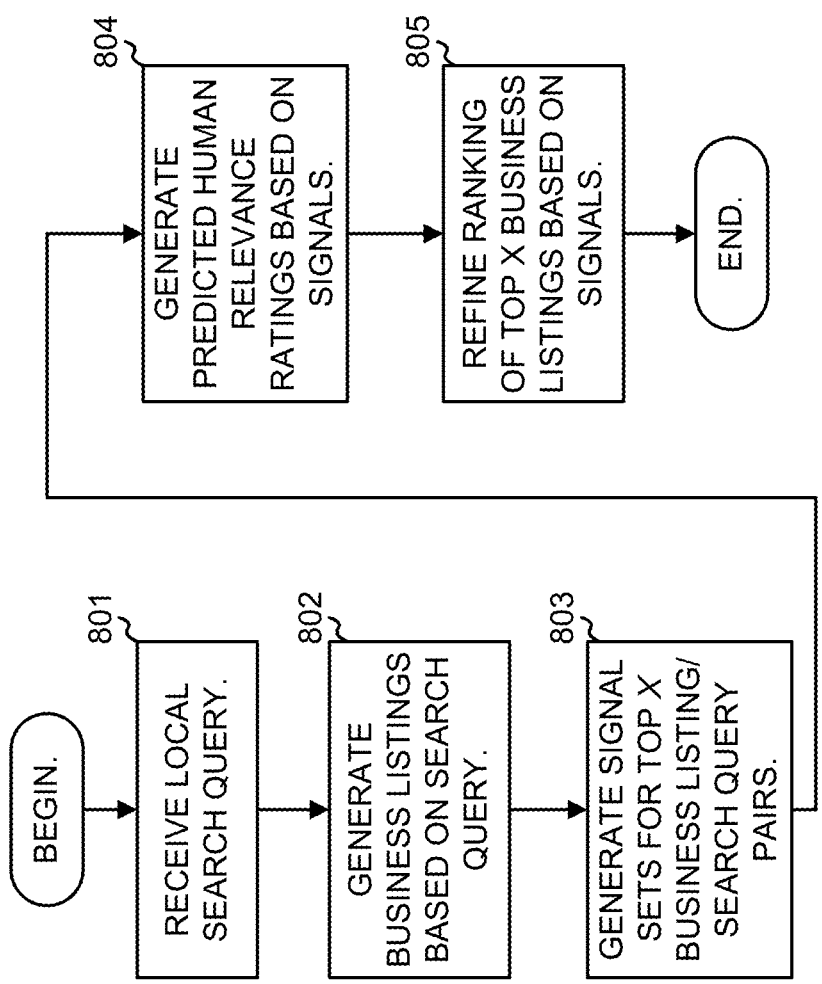
FIG. 8 is a flow chart illustrating exemplary operations in which the human ratings model shown in FIG. 2 is used to assist in ranking local search results generated by a search engine.

FIG. 8 is a flow chart illustrating exemplary operations in which human evaluation model 227 is used to assist in ranking local search results generated by search engine 225. To begin, a local search query may be received by search engine 225 (act 801). Search engine 225 may generate an initial set of search results (e.g., business listings) based on the search query and based on geographic location information received with or as a part of the query (act 802). The initial set of search results may be generated using existing information retrieval techniques in which the terms in the search query are matched to an inverted index generated from the business listings. The initial set of search results may be ranked in an initial ranking order determined based, for example, on how well the terms of the search query match the terms of the business listings. Techniques for initially ranking documents for relevance to a search query based on how well the terms of the search query match the documents, called information retrieval scoring techniques, are well known in the art. Such techniques can generate a metric called an information retrieval (IR) score that defines how well the terms of a search query match the document.

Signal generation component 705 may generate a signal set 715 for each of the top X search query/business listing pairs, where X is an integer greater than one (act 803). The generated signal sets 715 should match the signal set used when training human evaluation model 227. The trained human evaluation model 227 may generate predicted human relevance ratings/rankings based on the generated signal sets (act 804). In the context of the example described above, the predicted human relevance ratings may be a number between zero and three (i.e., the range used by the human evaluators) associated with each of the X business listings. The predicted human relevance ratings may then be used to refine the initial ranking of the X business listings (act 805). In implementation, the X business listings may simply be resorted based on the predicted human relevance ratings. The re-ranked business listings may be provided to the user that submitted the search query. Ideally, the most relevant business listings should be presented higher in the list of search results.

The operations described with the reference to the flow chart of FIG. 8 generally relate to refining or re-ranking results of a search engine. In alternate embodiments, the results of the search engine could be initially ranked based on the predicted relevance ratings. For example, the search engine may return a set of unordered documents that match the search query. A predicted relevance rating could be calculated for each of the documents and then used to rank the documents.

Exemplary Operation of Human Ratings Model in the Context of a General Web Search Engine Human evaluation model 227, in addition to being applicable in the context of a local search engine, can also be applied in the context of a general search engine, such as a general web search engine. In this implementation, the model used for human evaluation model 227 may be trained in a manner described with reference to FIG. 4. However, in this implementation, the documents that define the search results (act 401) may typically include web pages and a different signal set may be used in act 402.

Figure 9:
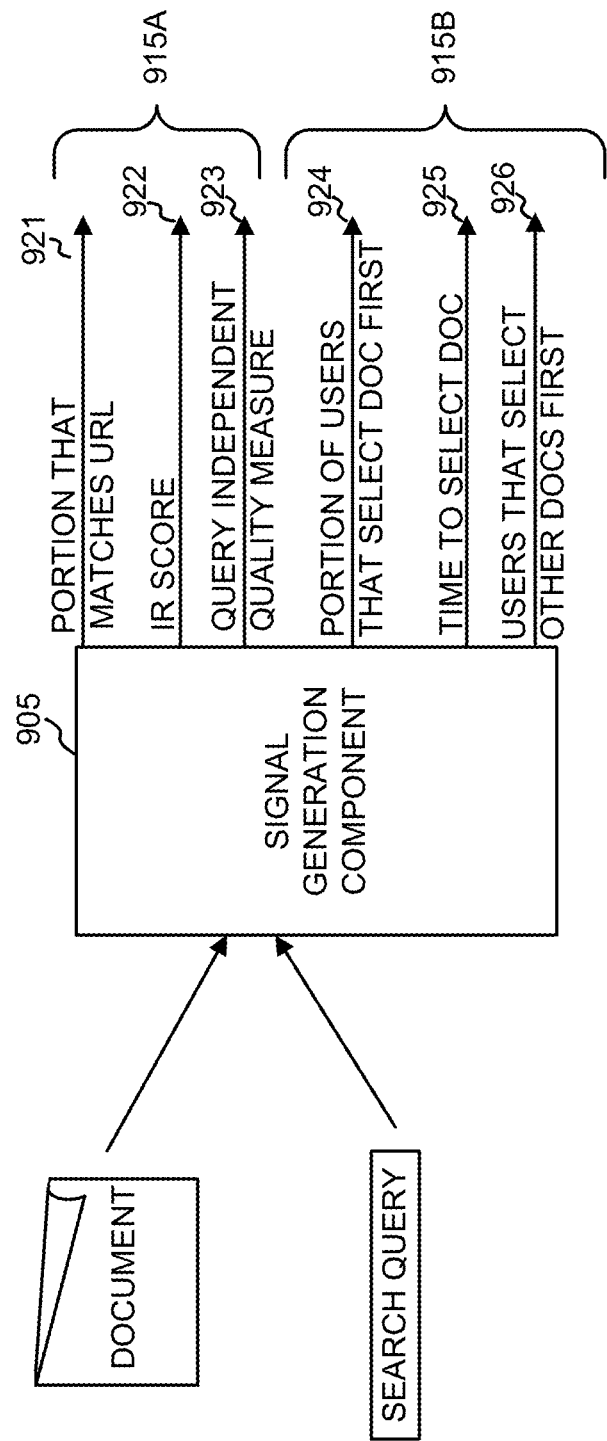
FIG. 9 is a diagram illustrating generation of an exemplary set of signals for a human ratings model when used in the context of a general search engine.

FIG. 9 is a diagram illustrating generation of an exemplary set of signals for human evaluation model 227 when used in the context of a general search engine. A set of signals 915 may be generated by a signal generation component 905 based on a particular input search result document and search query. Signal generation component 905 may generate a similar set of signals 915 for each search query/search result pair in the training corpus. Signals 915 may include signals based on static features 915A and signals based on dynamic features 915B.

The signals based on static features 915A may include signals 921-923. Signal 921 may be represented as a value that defines a portion of the search query that is contained within the URL of the web page. For example, if every term of the search query is contained within the URL, this signal may be given a value of one while if no terms of the search query are contained within the URL, this signal may be given a value of zero. Signal 922 may represent the IR score between the search query and the web page. Signal 923 may represent a query-independent quality measure of the web page, such as, for example, a link-based value computed for the web page.

The signals based on dynamic features 915B may include and may generally be derived from the aggregate behavior observed of human evaluators interacting with a set of documents returned to them in response to a search query. Search engine 225 may keep track of and store this behavior in "click logs." The click logs could be compiled based on user behavior that is anonymous and may be obtained with consent from the users. Dynamic features 915B may include signals 924-926, which may be based on information in the click logs for a particular search query, such as information defining a particular sequence of user clicks and the time durations between the clicks. The time duration between clicks can be used as an approximation of the time a user spent examining a document. For example, signal 924 may be a value indicating, for the document/search query pair, what portion of the users select the document first when it is returned to the user in a list of search results. Signal 925 may define how long it takes (i.e., the duration between when a user first views the result document set and selects the document) an average user to select the document when it is returned to the user at a particular location in a list of search results or how long a user spends viewing the document based on the sequence of user click times. Signal 926 may define the fraction of users that first selected another document before selecting this document.

One of ordinary skill in the art will recognize that signals 921-926 are exemplary and that numerous other signals based on similar concepts could be generated and used.

As with training of the human evaluation model 227 in the context of a local search engine, in the context of a web search engine, a regression or ranking analysis may next be performed on the generated signal set 915 and the corresponding human relevance ratings/rankings (act 403). A linear regression or other regression technique may be used. The result of the regression analysis may be a number of weights that define how future values of signal set 915 are to be combined to generate a predicted relevance rating for the signal set. These weights thus define the trained human evaluation model 227.

In one implementation, human evaluation model 227 may be used to refine rankings of potentially relevant web pages in a manner similar to how human evaluation model 227 may be used to refine ranking of potentially relevant business listings. In another implementation, human evaluation model 227 may be used to assess the quality of results returned from web search engine 225 and/or the quality of results returned from a modification to web search engine 225. For example, before web search engine 225 is modified to include a potentially new search technique, such as to include a new information retrieval score system, human evaluation model 227 can be used to automatically predict human relevance ratings/rankings for a large number of novel query-URL pairs, and can hence be used to assess the quality of the new information retrieval score system.

CONCLUSION

As described above, a statistical model may be created that relates human ratings of documents to objective signals generated from the documents, search queries, and/or other information (e.g., query logs). The model can then be used to predict human ratings/rankings for novel documents/search query pairs. These predicted ratings/rankings can be used to, for example, refine rankings from a search engine or assist in evaluating or monitoring the efficacy of a search engine system.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, although concepts consistent with the invention were generally described in the context of a local search engine or a general web search engine, the concepts could be generally applied to any type of search engine, such as a product search engine, a news (or story) search engine, or an email search engine.

Moreover, while a series of acts have been described with regard to FIGS. 4 and 8, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "components" or "models" that performs one or more functions. This elements may be implemented as hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method performed by one or more server devices, the method comprising:
    determining, by at least one of the one or more server devices, search results associated with search queries, the search queries and the search results forming respective search query/search result pairs;
    determining, by at least one of the one or more server devices and for each of the search query/search result pairs, signals relating to the search query/search result pair,
        the signals, for a particular search query/search result pair of the search query/search result pairs, including:
            a first signal defining a time duration for selection of the search result, of the particular search query/search result pair, from search results identified for the search query of the particular search query/search result pair,
                the time duration being based on a time between when the search results are presented for the search query, of the particular search query/search result pair, and when the search result, of the particular search query/search result pair, is selected, and
            at least one of:
                a second signal indicating selection of the search result, of the particular search query/search result pair, before selection of any other ones of the search results for the search query of the particular search query/search result pair, or
                a third signal indicating selection of another search result, of the search results identified for the search query of the particular search query/search result pair, before selection of the search result of the particular search query/search result pair,
        the first signal, the second signal, and the third signal being based on information, in one or more click logs, regarding user selections of particular search results, the particular search results being identified based on particular search queries;
    training, by at least one of the one or more server devices and based on the signals, a search engine to predict relevance ratings for search results;
    identifying, using the search engine, a particular search result that is relevant to a particular search query; and
    predicting, using the search engine, a relevance rating for the particular search result.

2. The method of claim 1, where the particular search result is associated with a particular rank among search results that are relevant to the particular search query, the method further comprising:
    adjusting the particular rank, of the particular search result, based on the predicted relevance rating.

3. The method of claim 1, further comprising:
    receiving, from one or more users, relevance ratings for the search results of the search query/search result pairs,
    where training the search engine includes training the search engine further based on the received relevance ratings.

4. The method of claim 1, where the signals further include:
    a first value that defines a portion of the search query, of the particular search query/search result pair, that is contained within a Uniform Resource Locator (URL) of a document corresponding to the search result, and
    a second value corresponding to a link-based value for the document corresponding to the search result, and
    where the search engine is trained further based on the first value and the second value.

5. The method of claim 1, where the signals further include a value that defines whether terms of the search query, of the particular search query/search result pair, are associated with a document corresponding to the search result of the particular search query/search result pair, and
    where the search engine is trained further based on the value.

6. The method of claim 1, further comprising:
    performing an analysis on the signals and a relevance rating for the search result of the particular search query/search result pair to obtain weights that are used to combine new values of the signals to generate a predicted relevance rating,
    where the relevance rating is predicted for the particular search result further based on the weights.

7. The method of claim 6, where the relevance rating is received from a user, and
    where performing the analysis includes performing a regression analysis.

8. One or more server devices comprising:
    one or more memories to store instructions; and
    one or more processors to execute the instructions to:
        determine signals relating to a search query and a search result,
            the signals including:
                a first signal defining a time duration for selection of the search result, from search results identified for the search query, based on a particular location at which the search result is presented within the search results,
                    the time duration being based on a time between when the search results are presented for the search query and when the search result is selected from the particular location within the search results, and
                at least one of:
                    a second signal indicating selection of the search result before selection of another search result of the search results identified for the search query, or
                    a third signal indicating selection of another search result, of the search results identified for the search query, before selection of the search result,
            the first signal, the second signal, and the third signal being based on information, in one or more click logs, regarding user selections of particular search results,
                the particular search results being identified based on search queries,
        train, based on the signals, a search engine to predict relevance ratings for search results of one or more search queries,
        identify a particular search result that is relevant to a particular search query, and predict, using the search engine, a relevance rating for the particular search result.

9. The one or more server devices of claim 8, where the one or more processors are further to:
receive, from a user, a relevance rating for the search result, where, when training the search engine, the one or more processors are to perform an analysis on the signals and the received relevance rating.

10. The one or more server devices of claim 9, where, when performing the analysis, the one or more processors are to:
perform a regression analysis to obtain weights that are used to combine new values of the signals to generate a predicted relevance rating,
where the relevance rating is predicted for the particular search result further based on the weights.

11. The one or more server devices of claim 8, where the signals further include a value that defines a portion of the search query that is contained within a Uniform Resource Locator (URL) of a document corresponding to the search result, and
where, when training the search engine, the one or more processors are to train the search engine further based on the value.

12. The one or more server devices of claim 8, where the signals further include a value that defines whether terms of the search query are associated with a document corresponding to the search result, and
where, when training the search engine, the one or more processors are to train the search engine further based on the value.

13. The one or more server devices of claim 8, where the signals further include a value corresponding to a link-based value for a document corresponding to the search result, and
where, when training the search engine, the one or more processors are to train the search engine further based on the value.

14. The one or more server devices of claim 8, where the one or more processors are further to:
rank the particular search result, among search results that are relevant to the particular search query, based on the predicted relevance rating.

15. A non-transitory computer-readable medium storing instructions, the instructions comprising:
one or more instructions which, when executed by one or more processors, cause the one or more processors to determine signals relating to a search query and a search result identified for the search query,
the signals including:
first information defining a particular sequence of selections relating to the search result and other search results identified for the search query, and
at least one of:
second information defining time durations between the selections, or
third information defining a time duration of the search result being accessed,
the time duration of the search result being accessed being based on the time durations between the selections,
the first information, the second information, and the third information being based on information, in one or more click logs, regarding user selections of particular search results,
the particular search results being identified based on search queries;
one or more instructions which, when executed by the one or more processors, cause the one or more processors to train, based on the signals, a search engine to predict relevance ratings for search results of one or more search queries;
one or more instructions which, when executed by the one or more processors, cause the one or more processors to identify a particular search result that is relevant to a particular search query; and
one or more instructions which, when executed by the one or more processors, cause the one or more processors to predict, using the search engine, a relevance rating for the particular search result.

16. The non-transitory computer-readable medium of claim 15, where the information defining the particular sequence of selections includes one of:
a first signal indicating selection of the search result before selection of any of the other search results, or
a second signal indicating selection of another search result, of the other search results identified for the search query, before selection of the search result.

17. The non-transitory computer-readable medium of claim 15, where the information defining the time durations includes:
a signal that is based on a time between when search results are presented for the search query and when the search result is selected.

18. The non-transitory computer-readable medium of claim 15, where the information defining the time duration of the search result being accessed includes information relating to a duration of time for accessing a document corresponding to the search result, based on the particular sequence of selections.

19. The non-transitory computer-readable medium of claim 15, where the signals further include one or more of:
a value that defines a portion of the search query that is contained within a Uniform Resource Locator (URL) of a document corresponding to the search result,
a value that defines whether terms of the search query are associated with the document corresponding to the search result, or
a link-based value for the document corresponding to the search result, and where the one or more instructions to train the search engine include:
one or more instructions which, when executed by the one or more processors, cause the one or more processors to train the search engine further based on the one or more of:
the value that defines the portion of the search query that is contained within the URL,
the value that defines whether the terms of the search query are associated with the document, or
the link-based value.

20. The non-transitory computer-readable medium of claim 15, the instructions further comprising:
one or more instructions which, when executed by the one or more processors, cause the one or more processors to receive, from a user, a relevance rating for the search result,
where the one or more instructions to train the search engine include:
one or more instructions which, when executed by the one or more processors, cause the one or more processors to perform an analysis on the signals and the received relevance rating, and
where the search engine is trained further based on results of performing the analysis.

* * * * *